United States Patent [19]

Benoit et al.

[11] Patent Number: 4,681,721

[45] Date of Patent: Jul. 21, 1987

[54] THERMOPLASTIC FILM EXTRUSION PROCESS EMPLOYING DIE WITH FILTERING ARRANGEMENT

[75] Inventors: Gordon L. Benoit, Macedon; Dana M. Boyd, Rushville, both of N.Y.

[73] Assignee: Mobil Oil Corporation, New York, N.Y.

[21] Appl. No.: 795,579

[22] Filed: Nov. 6, 1985

[51] Int. Cl.$^4$ ............................................ B29C 47/20
[52] U.S. Cl. ................................ 264/169; 264/563; 264/209.1; 264/209.8; 425/190; 425/197; 425/199; 425/205; 425/206; 425/207; 425/376 B; 425/467
[58] Field of Search .............. 264/209.8, 209.1, 176 F, 264/564, 563, 169; 425/198, 197, 199, 376 B, 467, 466, 133.1, 205-207; 210/DIG. 15

[56] References Cited

U.S. PATENT DOCUMENTS

| | | | |
|---|---|---|---|
| 3,419,938 | 1/1969 | Sonia et al. | 425/327 |
| 3,847,524 | 11/1974 | Mott | 425/198 |
| 3,861,843 | 1/1975 | Keuchel et al. | 425/198 |
| 4,085,174 | 4/1978 | Ishikawa et al. | 264/209.8 |
| 4,541,793 | 9/1985 | Lindqvist | 425/376 B |
| 4,562,022 | 12/1985 | Li et al. | 264/210.8 |

FOREIGN PATENT DOCUMENTS

| | | | |
|---|---|---|---|
| 2153467 | 5/1973 | Fed. Rep. of Germany | 425/467 |
| 2211854 | 9/1973 | Fed. Rep. of Germany | 425/467 |
| 2407808 | 7/1979 | France | 425/198 |
| 47-3017 | 1/1972 | Japan | 425/197 |
| 56-49739 | 11/1981 | Japan | 425/133.1 |
| 466119 | 7/1975 | U.S.S.R. | 425/199 |

Primary Examiner—Jeffery Thurlow
Attorney, Agent, or Firm—Alexander J. McKillop; Michael G. Gilman; Charles J. Speciale

[57] ABSTRACT

An annular extrusion die for the production of a tubular thermoplastic film web material, such as an annular extrusion die including a filtering arrangement for the formulation of a more consistently or uniformly distributed polymer melt conveyed to the die orifice of the extrusion die which will impart improved properties to the extruded thermoplastic film material. Also disclosed is a method of producing an improved extruded thermoplastic film web material through the utilization of the inventive extrusion die arrangement. A cavity or die flow chamber within the body of the annular extrusion die is filled with a particulate inert material of either uniform granular size or of random sizes, so as to force the polymer melt being conveyed towards the die orifice to randomly flow through the interstices which are present between the particles of the granular material, and thereby uniformly fill the cavity.

10 Claims, 3 Drawing Figures

THERMOPLASTIC FILM EXTRUSION PROCESS EMPLOYING DIE WITH FILTERING ARRANGEMENT

BACKGROUND OF THE INVENTION

1. Field of the Invention

The present invention relates to a novel extrusion die for the production of thermoplastic film web material, and more particularly, relates to an annular extrusion die for extruding a tubular thermoplastic film, which incorporates a novel filtering arrangement in the die body for the formulation of a more consistently or uniformly distributed polymer melt conveyed to the die orifice of the extrusion die, to there impart improved properties to the extruded thermoplastic film material. Moreover, the invention relates to a method of producing an improved extruded thermoplastic film web material through the utilization of the inventive extrusion die arrangement incorporating the novel filter for the polymer melt.

In essence, pursuant to the concept of imparting improved properties to a thermoplastic film web material, the invention provides for the incorporation of a central cavity forming a filtering chamber within the body of an annular extrusion die, which is filled with a particulate inert material of either uniform granular size or of random sizes, which will force the polymer melt being conveyed therethrough towards the die orifice to randomly flow through the interstices which are present between the particles of the granular material, and thereby cause the polymer to uniformly fill the cavity. Such a utilization of an inert particulate material forming a filter, especially a particulate material possessing a granular consistency, in a central flow chamber arranged in the die body upstream of the discharge orifice of the annular extrusion die, enables the following properties to be imparted to the polymer melt prior to its extrusion into a tubular thermoplastic film web material:

1. a high degree of filtration;
2. homogenation of high molecular weight gels;
3. a high shear field which erases the previous shear history of the polymer melt;
4. causing the melt to change direction, cross-sectional area, or to be distributed throughout the chamber without the creation of differential shears in the polymer melt.

In effect, the inventive annular extrusion die which is employed in producing tubular thermoplastic film webs imparts improved shear histories to the polymer melt, distributes the molten melt about the circumference of the die orifice, and develops a mass flow which facilitates the formation of a good caliper for the final thermoplastic film.

2. Discussion of the Prior Art

In the technology relating to the extrusion of tubular thermoplastic film webs through continuous molding processes, various types of annular extrusion dies are widely employed, of which the majority consist of annular extrusion dies which are of the side fed, spreader plate, spider and spiral die type, as is well known in the art. Each of these different extrusion die designs possesses both positive and negative features imparting different characteristics to the extrudate. For instance, the side fed die provides varying residence times to the polymer melt and produces a major weld in the extruded tubular film; the spider die and the spreader plate die each create differential shears and a large number of, although somewhat smaller, weld lines in the film; whereas, finally, the spiral die is extremely expensive to manufacture, and also produces differential shears in the film, which although less pronounced than that produced by the other types of dies, still presents a significant problem relative to the quality of the extruded tubular film material.

Although different types of extrusion devices are currently known in the art which provide for improvements in the homogenizing mixing and dispersion of polymer melts for high viscosity films, whereby such devices incorporate suitable filter structure, none of these devices are essentially analogous with that of the present invention, nor are they capable of imparting the properties to the polymer melt which is necessary for the production of a blow molded thermoplastic film material possessing superior characteristics.

Orso, et al. U.S. Pat. No. 3,888,963 discloses an extrusion apparatus for plastically moldable ceramic batch materials, which provides for in-line homogenization of the extrudable materials. This homogenization is effected by passing the materials through a plurality of screens and permitting the material to be admixed within a central chamber within the extrusion apparatus. However, in this instance, there is no provision for any granulate material filling the chamber in order to implement the random distribution of a polymer melt within an extrusion die to impart the improved properties thereto as contemplated by the invention.

Kalman U.S. Pat. No. 3,940,335 describes a filtering process and apparatus in which a substance, such as a viscous polymer material, is passed through a filter band which positioned to extend over a flow passageway, with the filter being passed through inlet and outlet ports to prevent leakage. However, there is no disclosure that any granulate material be incorporated within an extrusion die chamber as contemplated by the present invention so as to impart improved properties to a polymer melt prior to extrusion into a thermoplastic film material.

Finally, Russell, Jr. U.S. Pat. No. 4,260,350 discloses a filter for high viscosity liquids, in which a granulate material is interposed in a hollow cylindrical configuration between filter screens so as to provide for some dispersion of a high viscosity molten polymer supplied in a spiral or spinerette-type flow along a cylindrical path encompassing a hollow central space and to improve the mixing and filtering properties thereof. However, there is no disclosure of such a granular material filter being positioned as the filler in a central chamber in the body of an extrusion die having a single annular opening to produce a more uniform and random distribution of the polymer melt which will impart the properties to a tubular thermoplastic film web as is contemplated by the present invention.

SUMMARY OF THE INVENTION

In contrast with the foregoing, the inventive annular extrusion die for extruding tubular thermoplastic films generally eliminates the spreader plate, the spiders and the spirals of prior art dies, and replaces such die structure with a polymer melt homogenizing and filtering flow chamber centrally located within the body of the extrusion die, which flow chamber possesses a single annular inlet opening for the polymer melt at one end, and communicates with the die structure incorporating the extrusion die orifice, at its other or discharge end. The central flow chamber is filled with a particulate material, generally an inert granular material constituted of either uniformly or randomly sized and shaped granules. Generally, the polymer melt is conducted into the particulate-filled chamber through the single inlet provided at the center of the bottom thereof, and thereafter the melt randomly "winds" its way through the interstices which are present between the granules of the inert material to the outlet of the flow chamber, which is usually annular in configuration. Thereafter, the molten polymer flows to the die lip area for final flow distribution to the extrusion die orifice.

Alternatively, if desired, the particulate-filled flow chamber may also be designed with the polymer melt inlet being arranged at the side of the die flow chamber rather than at the bottom, so as to cause the polymer to initially flow circumferentially and then axially towards the outlet of the flow chamber, such side inlet flow and filter chamber construction allowing the extrusion die design to incorporate a large-diameter aperture extending along the longitudinal center axis of the extrusion die which can be employed to supply additional materials to the interior of the thermoplastic tubular film during extrusion. The particulate-filled die flow and filtering chamber pursuant to the invention is extremely simple in design, inexpensive to manufacture and easily maintained and serviced. Furthermore, the particulate-filled flow chamber imparts more uniform and slightly higher shears to the polymer melt than other die configurations currently employed in the technology.

Heretofore, in prior art methods of producing thermoplastic films, especially extruded tubular thermoplastic film webs, the molten polymer is discharged from the extruder through a screen pack, generally constituted of a collection of differing mesh screens supported by a breaker plate, in order to screen out unwanted materials from the polymer melt. Pursuant to the invention, this screen pack is replaced by a filter flow chamber centrally arranged within the body of the die and which is filled with a particulate material which filters and homogenizes the molten polymer to a more complete extent than heretofore, and its high shear can break up high molecular weight gels. Subsequent to the polymer melt leaving the filtration area, represented by the central particulate-filled filtration and flow chamber, the melt may travel through one or more turns or spirals before it is conveyed to the inlet or lip of the extrusion die, these turns imparting differential shears to the polymer melt inasmuch as the polymer travels a differently lengthy path on the inside than it does on the outside of each turn. Consequently, the tortuous path which the polymer melt encounters in the particulate-filled flow chamber leaves the polymer imparted with similar shears in all regions thereof, and consequently a more consistent-quality film can be produced by the annular extrusion die. When the polymer is received at the lip of the die, it must be distributed to all portions of the die; this being effected through the intermediary of small holes, such as ports and channels, which are in the form of spirals. These ports and spirals in the prior art are difficult and expensive to produce, and inherently produce differing shears in the film, again creating a non-uniform film in its properties.

A particulate-filled die flow chamber, pursuant to the invention, may be readily fitted into the body of the extrusion die in lieu of the ports and spirals presently employed, whereby the path of travel of the polymer melt towards the outlet channel leading to the extrusion die orifice creates approximately uniform or equal shears throughout the polymer melt, and erases all previous lower level shears for the formation of a more consistent extruded film.

Accordingly, it is an object of the present invention to provide an improved extrusion die for thermoplastic film web materials in which the film is imparted superior and more uniform properties in comparison with currently produced extruded thermoplastic films.

It is a more specific object of the present to provide an annular extrusion die for extruding a tubular thermoplastic film material from a polymer melt, incorporating a novel screen structure and a particulate-filled die chamber which provides the random flow homogenation and filtering of the polymer melt to provide an extruded tubular film possessing more uniform physical characteristics.

A further object of the present invention is to provide a method for improving the properties of a polymer melt utilized for the production of an extruded thermoplastic tubular film material.

BRIEF DESCRIPTION OF THE DRAWINGS

Reference may now be had to the following detailed description of a preferred embodiment of the inventive extrusion die for thermoplastic film material, taken in conjunction with the accompanying drawings; in which.

DETAILED DESCRIPTION

Figure 1:
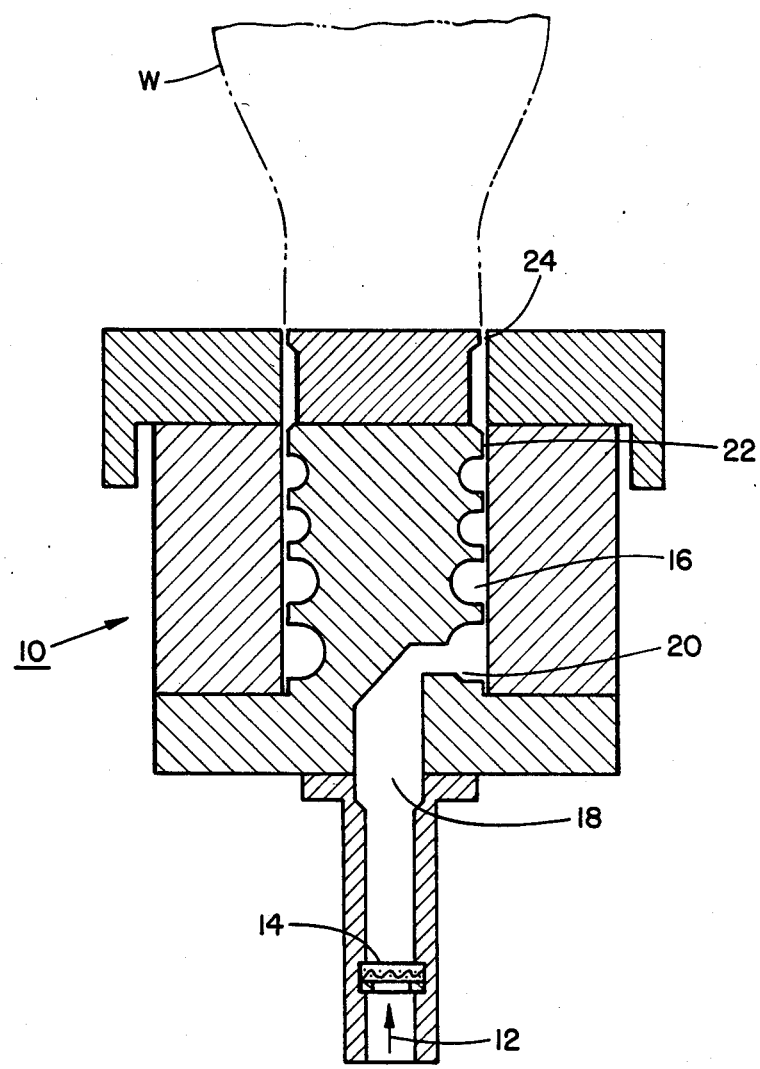
FIG. 1 illustrates a prior art spiral annular extrusion die for extruding tubular film from a supply of a polymer melt.

Referring now in detail to the drawings, FIG. 1 illustrates a typical prior art annular extrusion die 10 for extruding a tubular thermoplastic film from a polymer melt. In essence, a flow of polymer melt enters into a central passageway 12 which has a screen pack 14 disposed thereacross so as to impart some preliminary screening and mixing action to the polymer melt prior to the entering a central extrusion die flow chamber 16 formed in the body of the die. Prior to entering the die chamber 16, the melt passes through a feed port arrangement 18, which may consist of four to eight feed ports 20 as a spinerette arrangement in a typical spiral die for admixing the polymer melt. Thereafter, as the polymer melt enters through the inlet ports 20 into the chamber 16, it is conveyed towards and through spirals or spinerettes to impart centrifugal mixing action to the polymer melt which, however, does not fully eliminate the undesirable non-uniform properties of the polymer melt material, as discussed hereinabove. Furthermore, the construction of the spirals in the prior art spiral annular extrusion die is relatively complex and renders the structure uneconomical from the standpoints of both cost and maintenance. Thereafter, the polymer melt is conducted from the discharge end 22 of the spirals towards and through an extrusion orifice 24 at the die lip structure 26 to form the tubular film web W, as is well known in the art.

Figure 2:
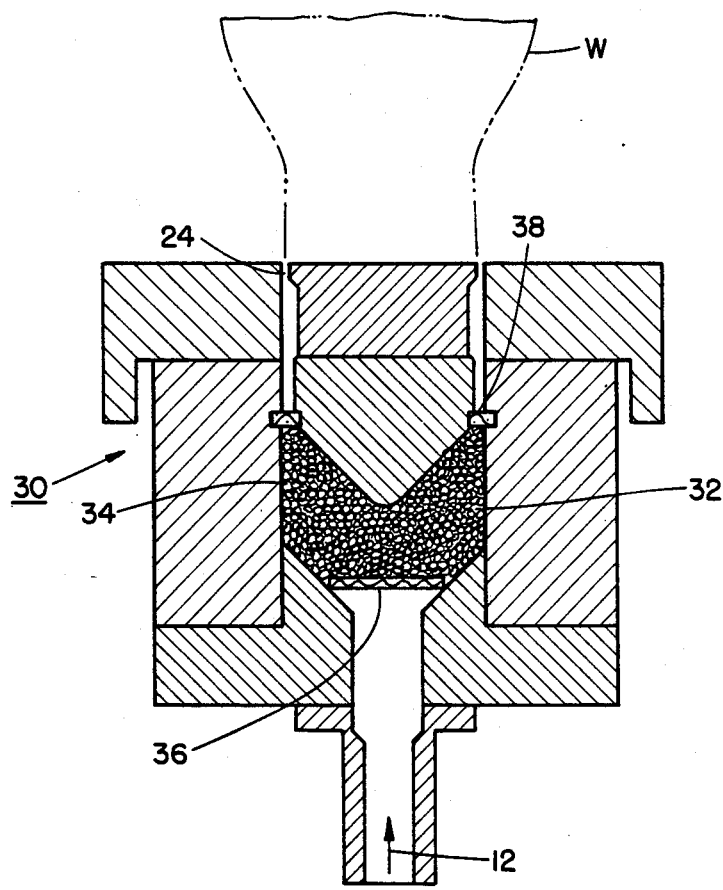
FIG. 2 illustrates an annular extrusion die for extruding an improved polymer melt, pursuant to the present invention.

In contrast with the foregoing prior art extrusion die structure 10 incorporating spirals in the die flow chamber, the relatively simple annular extrusion die 30 pursuant to the invention, as shown in FIG. 2 of the drawings, provides for a central die filtering and flow chamber 32 with a central inlet at the bottom thereof for the polymer melt, which is provided with a packing or filling of a particulate inert filler material 34, preferably constituted of either uniformly sized, or irregularly or randomly sized granules of the inert material, interposed between spaced inlet and outlet screens 36, 38, arranged respectively at the inlet and discharge ends of the chamber 32 which form retainers for the inert material. This will provide for the superior admixing and homogenation of the polymer melt as it is conveyed into the flow chamber 32 and conducted through the interstices between the granules 34 filling the chamber, so as to resultingly impart the desired properties to the polymer melt during its meandering path of flow, in effect, such as homogenation of high molecular weight gels; and also producing a high shear field to erase the previous shear history of the melt, while changing the flow direction, cross-sectional area and distribution of the melt without creating any differential shears. Furthermore, a high degree of filtration of unwanted materials from the polymer melt is also effected within the particulate-filled flow chamber 32, whereby there is completely prevented the formation of any weld lines on the extruded tubular film web material W due to the uniform shear which is achieved by the polymer melt within the flow chamber 32 as a result of the random flow and distribution imparted to the polymer melt by the flow thereof through the interspaces between the granules of the particulate material 34.

Figure 3:
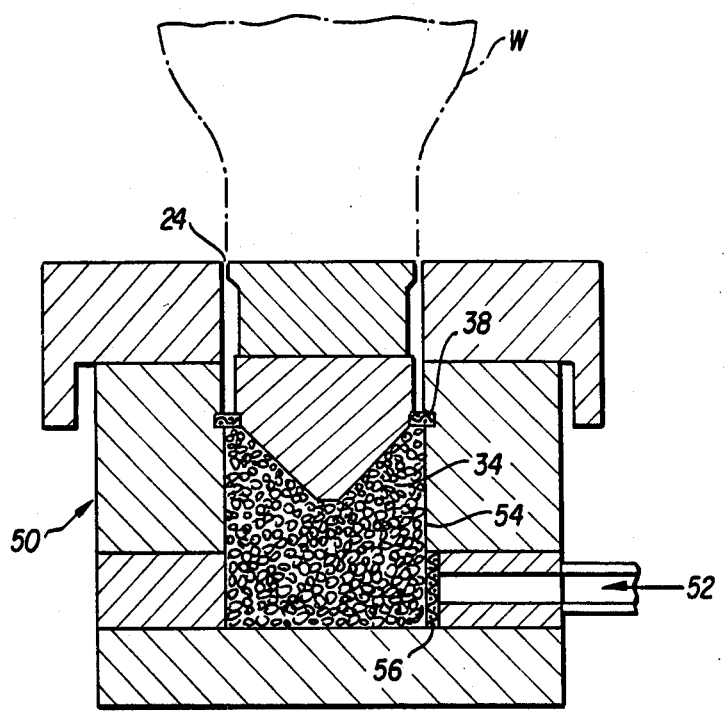
FIG. 3 illustrates another embodiment of an annular extrusion die modified with respect to that shown in FIG. 2.

The extrusion die 50 illustrated in FIG. 3 of the drawings is similar to that of FIG. 2 in which similar or identical components are identified by the same reference numerals and designations.

In contrast with the bottom central inlet 12 of FIG. 2, in this embodiment there is provided a side inlet 52 for the polymer melt.

The inlet 52 communicates with the central flow chamber 54 through an inlet screen 56 located towards the bottom of flow chamber 54. If desired, the inlet 52 may connect tangentially with the flow chamber 54. In effect, the introduction of the polymer melt from the side of the flow chamber 54 imparts a radial flow thereto prior to the axial flow of the melt towards the outlet screen 38. This will further enhance the admixing and homogenation of the polymer melt during its flow through the interstices between the granules of the particulate material 34.

From the foregoing, it becomes readily apparent to one skilled in the art that the novel annular extrusion die with the unique central particulate-filled die flow and filtration chamber and the method of utilization thereof produces a superior tubular polymer film in comparison with films obtainable with presently available annular extrusion dies for extruded films. Furthermore, the flow chamber may be readily disassembled, cleaned, and/or replaced by another particular-filled flow chamber, without requiring expensive components and which may also be difficult and time-consuming to service.

While there has been shown and described what is considered to be a preferred embodiment of the invention, it will of course be understood that various modifications and changes in form or detail could readily be made without departing from the spirit of the invention.

It is therefore intended that the invention be not limited to the exact form and detail herein shown and described, nor to anything less than the whole of the invention herein disclosed as hereinafter claimed.

What is claimed is:

1. In an annular extrusion die for extruding a tubular thermoplastic film web from a polymer melt with an improved polymer flow history; a die body with a central flow chamber having an inlet means for receiving a flow of a polymer melt, and an outlet communicating with a die orifice for extruding said melt to form a film web; first screen means extending across said inlet to said die chamber, and second screen means arranged in the outlet of said flow chamber to said die orifice; said first and second screen means forming an open space therebetween in said die flow chamber; and an inert particulate material filling the space in said die flow chamber intermediate said first and second screen means, said polymer melt being conveyed through the interstices between said particulate material in said die flow chamber so as to impart to said polymer melt a high degree of filtration, homogenation of high molecular weight gels in said polymer melt, a high shear field to erase the previous shear history of the melt, and causing the melt to randomly change its flow direction, cross-sectional area and distribution when passing through said die flow chamber without creating differential shears tending to adversely affect the uniformity and physical properties of the extruded film web.

2. An extrusion die as claimed in claim 1, wherein said particulate material in said die flow chamber is of a granular structure.

3. An extrusion die as claimed in claim 2, wherein the granular material comprises uniformly sized granules.

4. An extrusion die as claimed in claim 2, wherein the granular material comprises randomly sized, irregularly shaped granules.

5. An extrusion die as claimed in claim 1, wherein said inlet to the die flow chamber is at one side of said chamber to impart an initial radial flow to said polymer melt and thereafter axially towards the outlet of said chamber.

6. In a method for extruding a tubular thermoplastic film web from a polymer melt with an improved polymer flow history; conducting said polymer melt through a central die flow and filtering chamber having an inlet means for receiving a flow of said polymer melt, and an outlet communicating with an annular die orifice for extruding said tubular film web; first screen means extending across said inlet to said die chamber, and second screen means arranged in the outlet of said flow chamber to said die orifice; said first and second screen means forming an open space therebetween in said die flow chamber; and an inert particulate material filling the space in said die flow chamber intermediate said first and second screen means, conveying said polymer melt through said first screen means, the interstices between said particulate material in said die chamber and second screen means so as to impart to said polymer melt a high degree of filtration, homogenation of high molecular weight gels in said melt, a high shear field to erase the previous shear history of the melt, and causing the melt to randomly change its flow direction, cross-sectional area and distribution when passing through said die flow chamber without creating differential shears tending to adversely affect the uniformity and physical properties of the extruded film web.

7. A method as claimed in claim 6, wherein said particulate material in said die flow chamber is of a granular structure.

8. A method as claimed in claim 7, wherein the granular material comprises uniformly sized granules.

9. A method as claimed in claim 7, wherein the granular material comprises randomly sized, irregularly shaped granules.

10. A method as claimed in claim 6, wherein said inlet to the die flow chamber is at one side of said chamber to impart an initial radial flow to said polymer melt and thereafter axially towards the outlet of said chamber.

* * * * *